United States Patent [19]

Stingl

[11] 4,199,318
[45] Apr. 22, 1980

[54] WASHFAST DISAZO DYESTUFFS

[75] Inventor: Hans A. Stingl, Toms River, N.J.

[73] Assignee: Toms River Chemical Corporation, Toms River, N.J.

[21] Appl. No.: 962,424

[22] Filed: Nov. 20, 1978

Related U.S. Application Data

[60] Division of Ser. No. 693,593, Jun. 7, 1976, Pat. No. 4,143,035, which is a continuation of Ser. No. 489,865, Jul. 19, 1974, abandoned, which is a continuation of Ser. No. 123,443, Mar. 11, 1971, abandoned.

[51] Int. Cl.$^2$ ............... C09B 31/04; C09B 31/06; C09B 31/08
[52] U.S. Cl. .................................. 8/41 B; 8/82
[58] Field of Search ............................ 8/41 B

[56] References Cited

U.S. PATENT DOCUMENTS

| T932006 | 3/1975 | Emerson et al. | 8/41 B |
|---|---|---|---|
| T937003 | 8/1975 | Larson | 8/41 B |
| 3,643,269 | 2/1977 | Schweizer | 8/41 B |
| 3,676,050 | 7/1972 | James | 8/41 B |
| 3,932,378 | 1/1976 | Fasciati | 8/41 B |

FOREIGN PATENT DOCUMENTS 1511684  5/1978  United Kingdom ............ 8/41 B

Primary Examiner—Donald E. Czaja
Assistant Examiner—Maria S. Tungol
Attorney, Agent, or Firm—Edward McC. Roberts

[57] ABSTRACT

Compounds of the formula

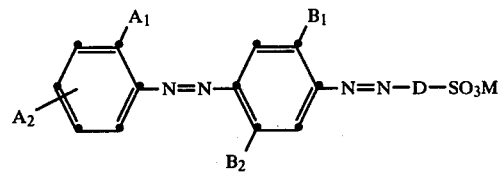

in which $A_1$ and $A_2$ may be hydrogen, alkyl, alkoxy, hydroxy, halo, trifluoromethyl, alkoxyalkoxy, hydroxyalkyl, hydroxyalkoxy, alkoxyalkyl, sulfamoyl, N-alkylsulfamoyl, carboxylic acyl or carboxylic acylamino, $B_1$ and $B_2$ are each hydrogen, lower alkoxy, lower alkyl, chloro, bromo, trifluoromethyl, alkoxyalkoxy, hydroxyalkyl, hydroxyalkoxy, or alkoxyalkyl, wherein at least one of $A_1$, $A_2$, $B_1$, or $B_2$ is alkoxy, and D represents a hydroxy or amino naphthyl or a benzylamino substituted phenyl group, are valuable dyestuffs for natural and synthetic polyamide fibers giving substantially complete exhaustion from neutral or acid aqueous dyebaths without further addition of chemical agents.

1 Claim, No Drawings

WASHFAST DISAZO DYESTUFFS

This is a division of application Ser. No. 693,593, now U.S. Pat. No. 4,143,035 filed on June 7, 1976, which is a continuation of application Ser. No. 123,443, filed Mar. 11, 1971 (now abandoned).

BACKGROUND OF THE INVENTION

In the dyeing of nylon fibers, it is common practice to use acid dyestuffs. However, in most cases the acid dyestuffs now employed suffer from the disadvantage that they have only poor or marginal washfastness. Under these circumstances the dyeings produced must necessarily be given an after-treatment with a fixing agent in order to obtain an acceptable degree of washfastness. The art has, therefore, been confronted with the problem of finding dyestuffs which show substantial washfastness on nylon fibers without the necessity of an after-treatment with a fixing agent. Compounds similar to those claimed herein are those as disclosed in Boll. Sci. Fac. Chem. Ind. Bologna 1969, 27(4) 305–12; as shown by Chem. Abs. Vol.73, 1970 (4920e). Structurally, those compounds differ in at least one respect from those of the instant invention, in that the prior art compounds do not possess an alkoxy substituent. The compounds of this invention have, among other properties, a better solubility in an aqueous dyebath. Also, other known compounds (C.I. Acid Red 104, 116, 148, 177) which are similar to the compounds of this invention are also considerably less soluble in an aqueous dyebath. In addition, a dye similar to dyes of this invention wherein D is a benzylaminophenyl group is commercially available. This particular dye is one in which $R_2$ is ethyl, $R_3$ and $A_2$ are hydrogen, and $A_1$ and $B_1$ are methoxy, and $B_2$ is methyl. However, the particular dye of this invention similar to this known dye shows surprising and unexpected advantages in having a substantially better light fastness, as well as showing a good washfastness.

SUMMARY OF THE INVENTION

In accordance with this invention, new dyes have been discovered which have an excellent affinity for natural and synthetic fibers, including wool, silk and nylon. These dyes exhaust substantially completely from neutral or acid aqueus dyebaths and show good washfastness without the necessity of an after-treatment with a fixing agent, as has been required for most acid dyes in the past. These dyes also exhibit good solubility and light fastness. These new dyestuffs dye polyamide fibers and fabrics in very strong washfast shades and accordingly avoid the disadvantages found with prior art dyes used for this purpose.

The compounds of this invention may accordingly be represented by the following structural formula:

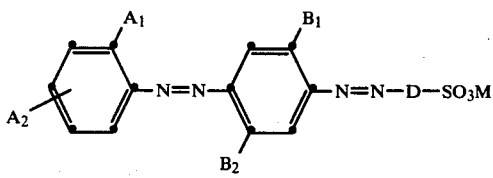

wherein each of $A_1$ and $A_2$ may be hydrogen, $C_{1-6}$ lower alkoxy, $C_1$–$C_6$ lower alkyl, hydroxy, chloro, bromo, trifluoromethyl, $C_{1-6}$ alkoxy-alkoxy, $C_{1-6}$ hydroxyalkyl, $C_{1-6}$ hydroxyalkoxy, $C_{1-6}$ alkoxy-alkyl, sulfamoyl, N-alkyl substituted sulfamoyl containing up to 6 carbon atoms, carboxylic acyl of up to 7 carbon atoms or carboxylic acylamino of up to 7 carbon atoms, each of $B_1$ and $B_2$ may be hydrogen, $C_{1-6}$ lower alkoxy, $C_{1-6}$ lower alkyl, hydroxy, chloro, bromo, trifluoromethyl, $C_{1-6}$ alkoxy-alkoxy, $C_{1-6}$ hydroxyalkyl, $C_{1-6}$ hydroxyalkoxy, $C_{1-6}$ alkoxy-alkyl; at least one of $A_1$, $A_2$, $B_1$ or $B_2$ being $C_1$–$C_6$ lower alkoxy; and D represents a group of the formula

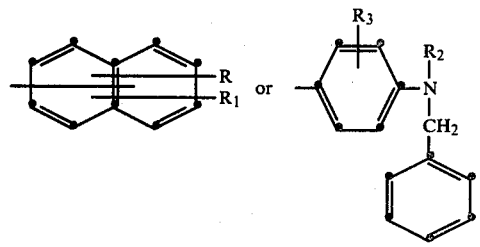

wherein each of R and $R_1$ is hydrogen, hydroxy or amino ($NH_2$), at least one of R and $R_1$ being hydroxy or amino, and only one of R or $R_1$ being hydroxy or amino at any one time; and M is hydrogen, alkali metal (Na,K,Li) or $NH_4$; and wherein $R_2$ is $C_{1-6}$ alkyl, benzyl, $C_{1-6}$ hydroxyalkyl or $C_{1-6}$ alkoxyalkyl and $R_3$ is $C_{1-6}$ alkyl, or $C_{1-6}$ alkoxy.

Attachment of the azo linkage to the above described naphthalene compounds generally takes place in an available position, ortho or para, to the amino or hyroxy group according to the rules and preferences established in the prior art, sometimes even under simultaneous elimination of a third substituent on the naphthalene compound from the attacked position. For example, in the case of 2-naphtholsulfonic acids or 2-naphthylaminesulfonic acids, the azo group attaches to the 1-position; in the case of 1-naphthol-3-sulfonic acids, the azo group attaches to the 2-position. Furthermore, an acidic coupling medium enhances the directing power of the amino group, an alkaline medium that of the hydroxy group, so that either of the two favored reaction products can be isolated to practical exclusion of the other in many cases by proper choice of the reaction conditions when an aminonaphtholsulfonic acid is used as coupler. (See, e.g., Heinrich Zollinger, Diazo and Azo Chemistry, Interscience Publishers, Inc. N.Y., 1961, pgs. 210f, 253f, 258f.)

In the more preferred aspect of this invention, $A_1$ and $A_2$ are each hydrogen, methyl, methoxy or chloro, and if one substituent is methyl or chloro, the other is preferably hydrogen or methoxy; $B_1$ and $B_2$ are each hydrogen, $C_{1-2}$ alkyl or $C_{1-2}$ alkoxy and if one of $B_1$ or $B_2$ is $C_{1-2}$ alkyl, the other is preferably other than $C_{1-2}$ alkyl; and especially at least one of $A_1$, $A_2$, $B_1$ or $B_2$ is methoxy; and D is selected from the group consisting of 1-hydroxy-4-sulfo-2-naphthyl, 2-hydroxy-8-sulfo-1-naphthyl, 2-hydroxy-6-sulfo-1-naphthyl, 2-amino-6-sulfo-1-naphthyl, 2-amino-7-sulfo-1-naphthyl, 2-amino-8-sulfo-1-naphthyl, 2-amino-8-hydroxy-6-sulfo-1-naphthyl, 2-amino-5-hydroxy-7-sulfo-1-naphthyl, 1-amino-4-sulfo-2-naphthyl, 2-amino-8-hydroxy-6-sulfo-7-naphthyl or 2-amino-5-hydroxy-7-sulfo-6-naphthyl.

In the most preferred aspect of this invention $A_1$ is hydrogen or methoxy; $A_2$ is hydrogen, methyl or methoxy $B_1$ and $B_2$ are independently hydrogen, methyl or methoxy; with the proviso that at least one of the four substituents is methoxy; and that only one can be methyl and then only in the same benzene ring as the methoxy group and in para-position to it; and D—SO$_3$M is 1-hydroxy-4-sulfo-2-naphthyl, 2-hydroxy-6-sulfo-1-naphthyl, 2-amino-8-hydroxy-6-sulfo-1-naphthyl and 2-amino-6-sulfo-1naphthyl.

The dyestuffs of this invention can be prepared by well-known methods in the art. For example, an appropriate aromatic amine may be diazotized and coupled in the para-position to another appropriate aromatic amine. The second amine may suitably be coupled in the form of its N-methane sulfonic acid and the product thereafter saponified to obtain the desired substituted para-aminoazobenzene compound. This compound is then diazotized by well-known means and reacted with an appropriate coupler designated as H—D—SO$_3$M.

In an alternative procedure an appropriate diazotized para-nitroaniline compound may be reacted with a phenol compound followed by, if desired, alkylation of the product by known methods and reduction of the nitro group to the corresponding; amino group. The compound thus obtained may be finally coupled with an appropriate H—D—SO$_3$M compound. If desired, an alkylation step may be carried out as the last step in the sequence.

In another alternative procedure, an appropriate diazotized para-nitroaniline compound is coupled to an appropriate naphthalene compound, followed by reduction and diazotization of the product thus formed and coupling with an appropriate phenol compound, and, if desired, alkylation of the hydroxy group on the phenol moiety of the dyestuff.

In the alternative, the para-nitroaniline compound in the latter two processes can be replaced with a para-phenylene diamine compound, one of which amino group is protected; for example, by an acyl group (acetyl). After coupling of this compound the protective group is removed, i.e. by hydrolysis or saponification and the remaining steps of the reaction continued.

Preferably, in carrying out the process for the preparation of the compounds of this invention, an aniline compound of the formula

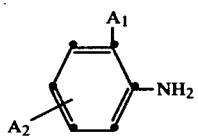
(1)

may be diazotized in an aqueous hydrochloric acid solution in a normal manner with sodium nitrite. Subsequently, an aniline compound of the formula

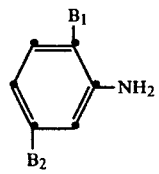
(2)

and the diazotized aniline compound described above are coupled under well-known coupling conditions to obtain an intermediate are compound of the formula

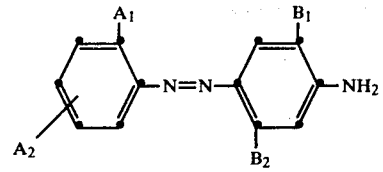
(3)

This intermediate are compound may then be appropriate diazotized and subsequently couped with a coupler of the formula

H—D—SO$_3$M   (4)

In the preferred embodiment of this invention, compounds 1,2 and 4 above are those which will lead to the preferred dyestuffs of this invention.

The compounds of this invention are particularly suitable for dyeing nylon apparel that require high washfastness in deep shades, such as nylon outerwear, socks and the like. The particular nylon material can readily be dyed from aqueous dyebaths at pH values of 5.5 to 7.5 and preferably 6.0 to 7.0 at a liquor ratio of 10:1 to 40:1. The initial pH can be adjusted to the desired value by an appropriate acid or basic treatment or by buffering the solution. Preferably, the bath is buffered with a mixture of monosodiumphosphate and disodiumphosphate.

EXAMPLE 1

23.25 parts of aniline are dissolved in 125 parts of water and 61 parts of hydrochloric acid (d.1.16), the temperature is adjusted to 0° C. with ice, and a solution of 17.5 parts of sodium nitrite in 35 parts of water is added during 15 minutes to achieve diazotization at 0°-3° C.

34.3 parts of 2-methoxy-5-methylaniline is dissolved at 45° C. in 300 parts of water and 31 parts ofhydrochloric acid (d.1.16), the temperature is adjusted to 0° C. with ice, and the diazotized aniline solution is added over a period of two hours while the pH value is simultaneously raised and held at 3.0 by administering sodium acetate, as a 25% by volume aqueous solution. The pH is eventually raised to 3.7, which required 28 parts of sodium acetate. A temperature of 4° to 7° C. is maintained for 12 hours. It is subsequently allowed to rise to 25° C. during 6 hours and finally raised to 60° C. in two hours. After addtion of 12 parts of hydrochloric acid, the monoazo compound is isolated by filtration and washed with 500 parts of acidified water at 55° C., followed by 50 parts of water at 55° C.

The filter cake is reslurried in 650 parts of water and 80 parts of hydrochloric acid (d.1.16), cooled to 5° C. by addition of ice, and rediazotized at 5° to 8° C. by addition of 17.5 parts of sodium nitrite, dissolved in 35 parts of water, during 30 minutes. After stirring for 2 hours the solution is clarified and added during 45 minutes, at 3° to 5° C., to the coupler that had been prepared as follows:

56 parts of 2-naphthol-6-sulfonic acid are dissolved in 1100 parts of water and 100 parts of soda ash at 55° C.Ice is added to lower the temperature to 3° C. The end product is filtered at 60° C., washed with 1000 parts of 4% aqueous sodium chloride solution, and dried. It has the structure

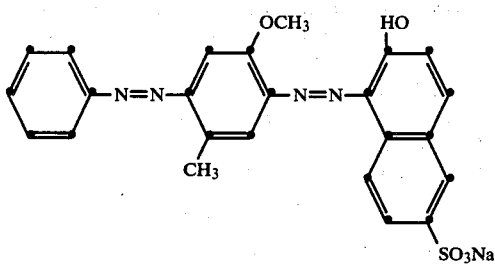

and dyes nylon from a neutral dyebath in bright, strong, very reddish violet shades of excellent washfastness and good light fastness.

Similarly, when o-methylaniline, p-ethoxyaniline, p-chloroaniline, m-bromoaniline, p-hydroxyaniline, m- or p-trifluoromethylaniline, p-hydroxyethylaniline, p-methoxyethoxyaniline, p-ethoxypropylaniline, p-acetamidoaniline, p-propionylaniline, p-chloro-o-methylaniline, or p-hydroxyethoxyaniline is used in place of aniline in the above example, there is obtained the corresponding appropriately substituted disazo dyestuff.

EXAMPLE 2

Replacing 2-naphthol-6-sulfonic acid in Example 1 by 1-naphthol-4-sulfonic acid gives a dye of the structure

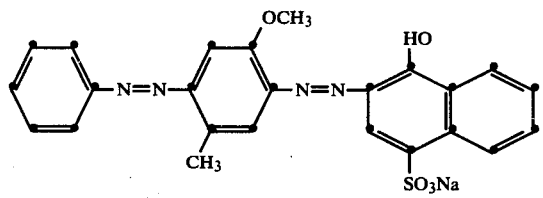

which dyes nylon from a neutral dyebath in bright reddish violet shades of excellent washfastness.

EXAMPLE 3

Replacing 2-naphthol-6-sulfonic acid in Example 1 by 2-naphthol-8-sulfonic acid gives a dye of the structure

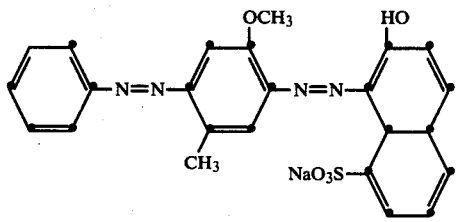

which dyes nylon from a neutral or weekly acid dyebath in strong bright bluish red shades of excellent washfastness.

EXAMPLE 4

30.8 parts of o-anisidine are dissolved in 375 parts of water and 77 parts of hydrochloric acid (d.1.16), cooled to 0° C. with ice, and a solution of 17.5 parts of sodium nitrite in 35 parts of water is added during 10 minutes to achieve diazotization at 0°-3° C. 34 parts of 2-methoxy-5-methylaniline are dissolved in 100 parts of water and 29 parts of hydrochloric acid (d.1.16) at 55° C. and added to the diazotizedo-anisidine solution during 5 minutes. The end-temperature of 8° C. is maintanined for 30 minutes. 75 parts of sodium acetate, as a 25% by volume aqueous solution, are then added during 3 hours to raise the pH to 4.2 while the temperature rises to 12° C. After stirring for 12 hours, the monoazo compound is isolated by filtration at room temperature and washed with 500 parts of water. The filtercake is reslurried in 500 parts of water and 80 parts of hydrochloric acid (d.1.16), cooled to 0° C. by addition of ice, and rediazotized at 0°-4° C. by addition of 18 partsof sodium nitrite, dissolved in 35 parts of water, during 5 minutes. The solution is clarified 30 minutes later and added during one hour, at 3° to 5° C., to 56 parts of 1-naphthol-4-sulfonic acid that has been dissolved in 1500 parts of water and 75 parts of soda ash. The reaction product is stirred at 5° C. for two hours, heated to 75° C., filtered, washed with 900 parts of 3% aqueous sodium chloride solution at 80° C., and dried. It has the structure

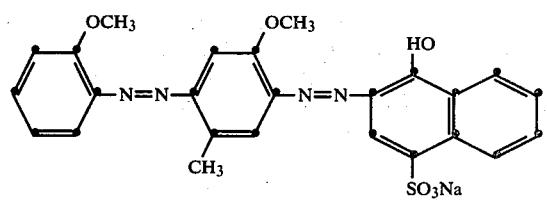

and dyes nylon from neutral or weakly acid dyebaths in powerful violet shades with good light fastness and excellent washfastness.

Similarly, when 2-methoxyaniline, 2-ethylaniline, 3-hydroxyethylaniline, (used as their N-methane sulfonic acids, with saponification after first coupling), 2,5-diethoxyaniline or 2-ethoxy-5-methylaniline is used in place of 2-methoxy-5-methylaniline, in the above example, there is obtained the corresponding appropriately substituted disazo dyestuff.

Similarly, when 2-hydroxynaphthalene-6-sulfonic acid, 2-hydroxynaphthalene-8-sulfonic acid, 2-hydroxynaphthalene-3-sulfonic acid, 1-aminonaphthalene-4-sulfonic acid, 8-amine-2-hydroxynaphthalene-5-sulfonic acid, 3-amino-2-hydroxynaphthalene-7-sulfonic acid, 6-amino-2-hydroxynaphthalene-8-sulfonic acid, 1-hydroxynaphthalene-3-sulfonic acid, 1-hydroxynaphthalene-5-sulfonic acid, 1-hydroxynaphthalene-6-sulfonic acid, 1-hydroxynaphthalene-7-sulfonic acid, 1-hydroxynaphthalene-8-sulfonic acid, 5-amino-1-hydroxynaphthalene-2-sulfonic acid, 8-amino-1-hydroxynaphthalene-6-sulfonic acid, 3-amino-8-hydroxynaphthalene-6-sulfonic acid or 6-amino-1-hydroxynaphthalene-2-sulfonic acid is used in place of 1-hydroxynaphthalene-4-sulfonic acid in the above example, the corresponding disazo compounds are obtained.

EXAMPLE 5

The clarified monoazodiazo solution is prepared as described in Example 4. The end coupler is prepared as follows:

56 parts of 2-naphthylamine-6-sulfonic acid (sodium salt) are dissolved in 1400 parts of water at 45° C.; 25 parts of sodium acetate is added, followed by sufficient ice to lower the temperature to 2° C.

The monoazodiazo solution is added to the coupler during two hours at 2°-5° C. The pH is subsequently raised to 5.0 with soda ash solution, and again, after stirring for one hour at 5° to 12° C., to 7.0° . One hour later the product is filtered at 15° C. It is represented by the structure

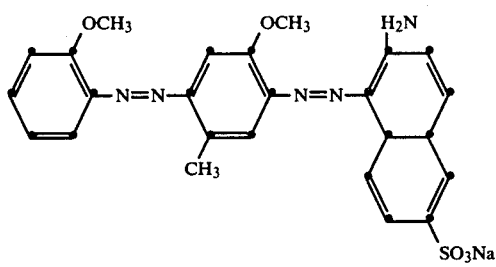

and dyes nylon from neutral dyebaths in powerful, very reddish violet shades of very good light and washfastness.

EXAMPLE 6

The procedure of Example 5 is followed except that 2-naphthylamine-6-sulfonic acid is replaced by 58.5 parts of 2-amino-8-naphthol-6-sulfonic acid (sodium salt) and 47.5 parts of sodium α-naphthalene sulfonate, followed by 40 parts of hydrochloric acid (d.1.16) to adjust to pH 4.6, and this pH is gradually raised to 4.8 with 200 parts of sodium acetate, as 25% aqueous solution, while the monoazodiazo solution is being added during 3 hours at 3°-5° C. The temperature is then permitted to rise to 20° C. during 12 hours. Finally, caustic soda is added to neutralize to pH 7.0, and the product is isolated by filtration, washed with 500 parts of 3% aqueous sodium chloride solution, and dried. It has the structure

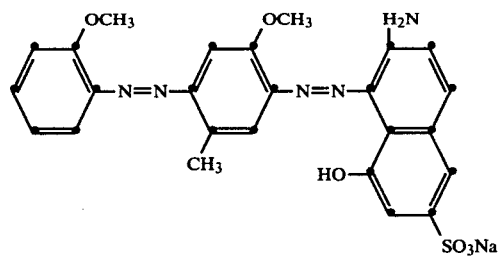

and dyes nylon from neutral dyebaths in deep navy blue shades of excellent light and washfastness.

EXAMPLE 7

The procedure of Example 5 is followed except that 2-naphthylamine-6-sulfonic acid is replaced by 80 parts of α-N-ethyl-0-ethylanilino-toluene-m-sulfonic acid (sodium salt), dissolved at pH 6 in 750 parts of water, followed by addition of 10 parts of sodium acetate, ice to cool to 0° C., and 40 parts of soda ash, as 20% aqueous solution, at a rate required to hold a pH 6.5-7.0 while the monoazodiazo solution is being added during five hours at 0°-5° C. Twelve hours later the temperature is raised to 80° C., the pH adjusted to 9.0, and salt added in the amount of 7% by volume. The dye isisolated by filtration at 40° C. and dried. It has the structure

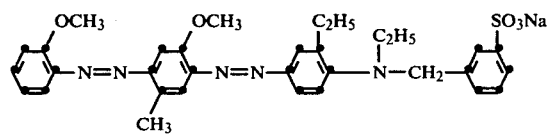

When α-N-propyl-o-ethylanilino-toluene-m-sulfonic acid, α-N-methyl-m-toluidino-toluene-m-sulfonic acid, α-N-hydroxyethyl-m-toluidino-toluene-m-sulfonic acid, or α-N-methoxyethyl-m-toluidino-toluene-m-sulfonic acid is used in place of α-N-ethyl-0-ethylanilino-toluine-m-sulfonic acid is used in place of α-N-ethyl-o-ethylanilino-toluene-m-sulfonic acid in the above example, there is obtained the corresponding disazo dyestuff.

EXAMPLE 8

The procedure of Example 7 is followed except that 76.5 parts of α-N-ethyl-m-toluidino-toluene-m-sulfonic acid is used. The dye obtained has the structure

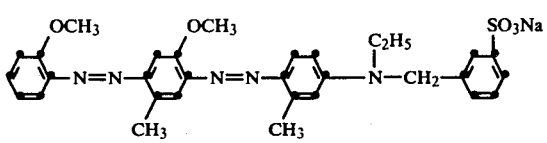

and dyes nylon in a strong bluish red shades of excellent light and washfastness.

EXAMPLES 9, 10 and 11

Replacing 2-methoxy-5-methylaniline in Example 1 by 38.3 parts of 2,5-dimethoxyaniline and using the end couplers of Examples 1, 2 and 3, respectively, gives wash and light fast dyes of the structures

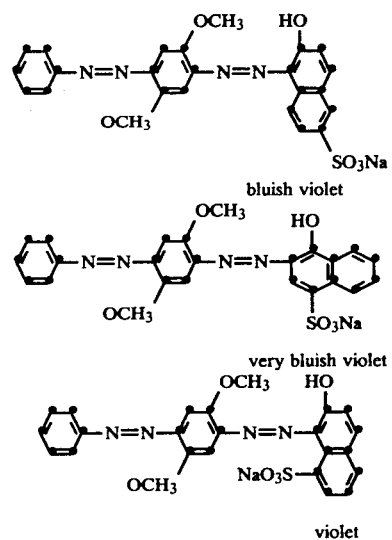

Similarly, including teachings from Examples 5 to 7, the following wash and light fast dyes are obtained:

EXAMPLE 12

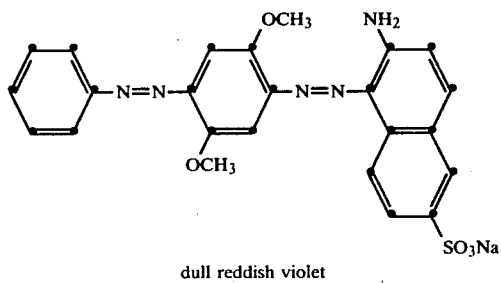

dull reddish violet

EXAMPLE 13

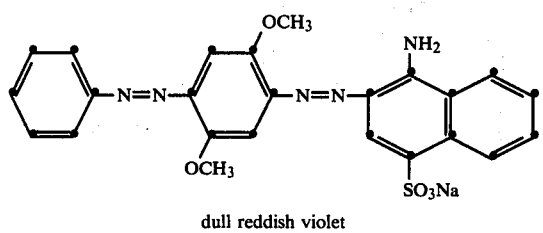

dull reddish violet

EXAMPLE 14

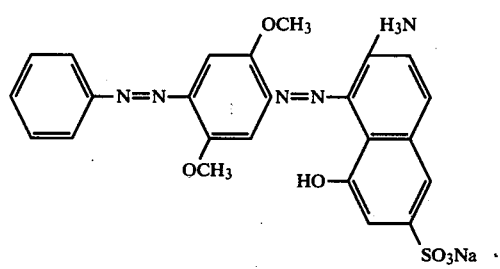

bluish red

EXAMPLE 15

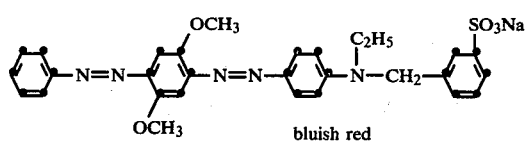

(greenish) navy blue

EXAMPLE 16 o-Anisidine is diazotized as outlined in Example 4. 38.3 parts of 2,5-dimethoxyaniline are dissolved at 45° C. in 300 parts of water and 29 parts of hydrochloric acid (d.1.16), the temperature is adjusted to 0° C. with ice, and the diazotized o-anisidine solution is added over a period of 30 minutes at 0°–3° C. The pH is then gradually raised to 3.5 by addition of 40 parts of sodium acetate during 3 hours. A temperature of 2°–5° C. is maintained for 12 hours and subsequently allowed to rise to 20° C. during 6 hours. The coupling product is filtered and washed with 150 parts of 3% aqueous sodium chloride solution.

The filtercake is reslurried in 600 parts of water and 65 parts of hydrochloric acid (d.1.16), cooled to 5° C. by addition of ice, and rediazotized at 5° to 8° C. by addition of 17.5 parts of sodium nitrite, dissolved in 35 parts of water, during 30 minutes. After stirring for 2 hours, the solution is added to a preparation of 56 parts of 2-naphthol-6-sulfonic acid, and the final product isolated, as described in Example 1. The compound obtained has the structure

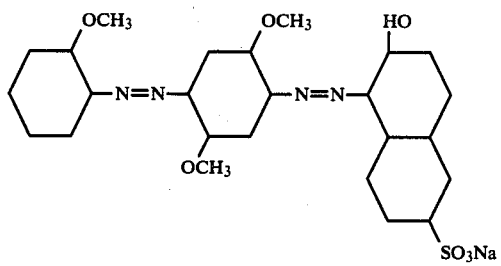

and dyes nylon from a neutral dyebath in strong, very bluish violet shades of excellent washfastness and good light fastness.

When selecting different end couplers and applying the proper methods given before, the following wash and light fast dyes are obtained:

EXAMPLE 17

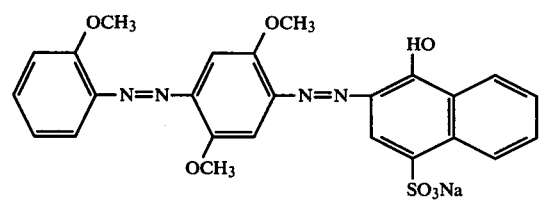

reddish navy blue

EXAMPLE 18

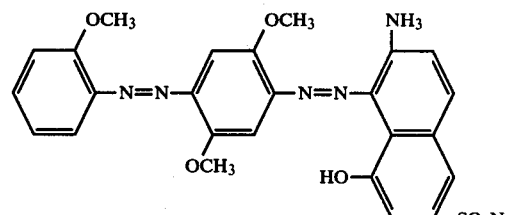

greenish navy blue

The following compounds, obtained by similar methods, are to further illustrate the present invention:

EXAMPLE 19

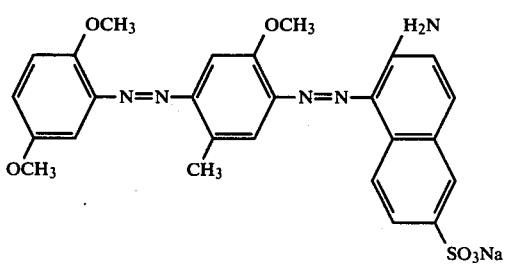

reddish violet

EXAMPLE 20
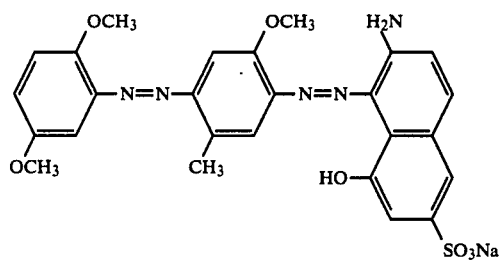
navy blue
EXAMPLE 21
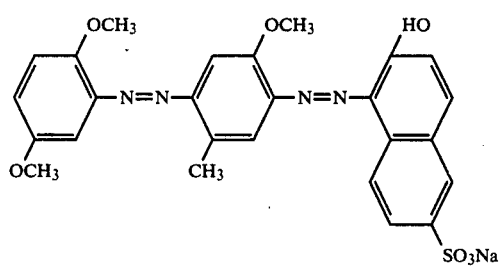
violet
EXAMPLE 22
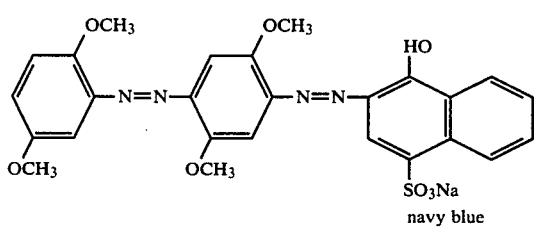
navy blue
EXAMPLE 23
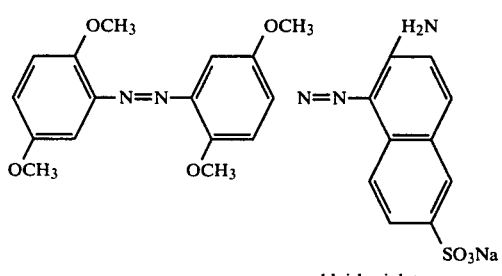
bluish violet
EXAMPLE 24
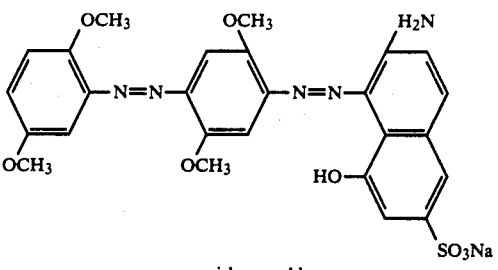
greenish navy blue
EXAMPLE 125
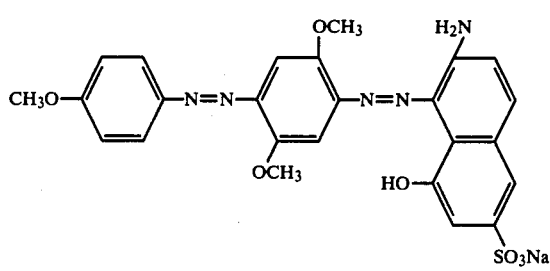
navy blue
EXAMPLE 26
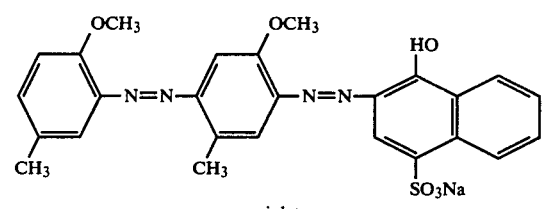
violet
EXAMPLE 27
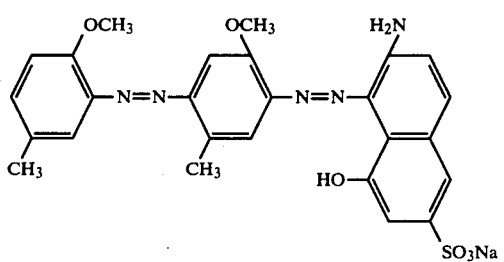
navy blue
EXAMPLE 28
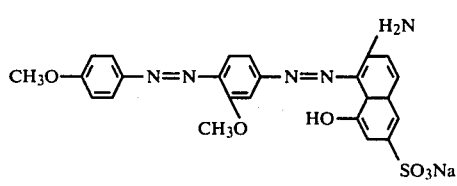
bluish violet

EXAMPLE 29
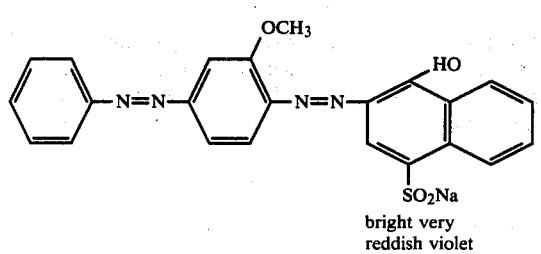
bright very reddish violet
EXAMPLE 30
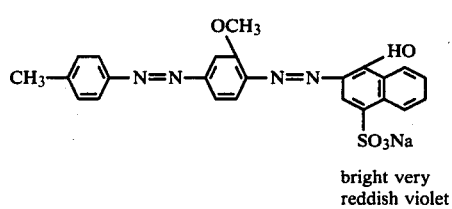
bright very reddish violet
EXAMPLE 31
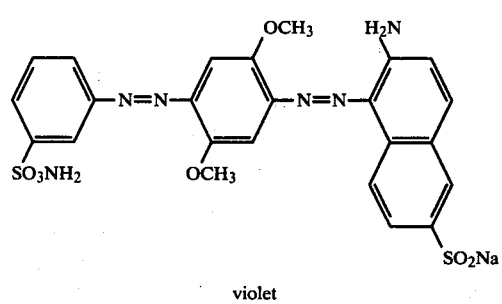
violet
EXAMPLE 32
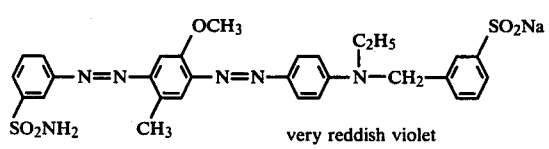
very reddish violet
EXAMPLE 33
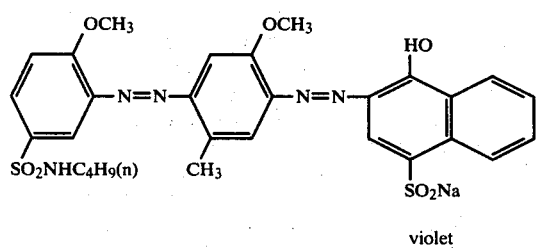
violet
EXAMPLE 34
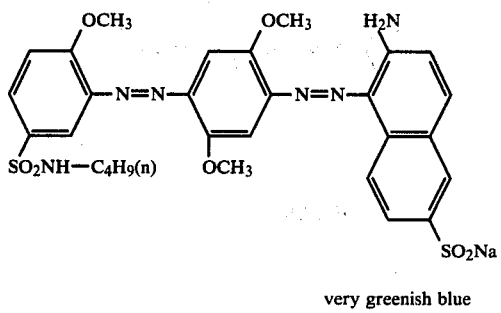
very greenish blue
EXAMPLE 35
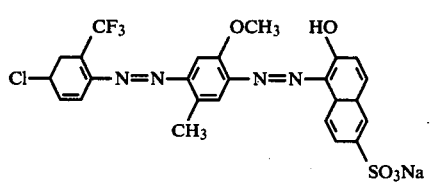
EXAMPLE 36
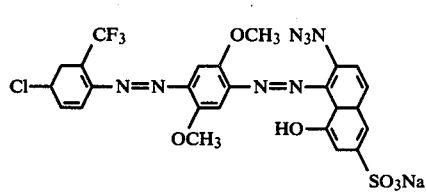
EXAMPLE 37
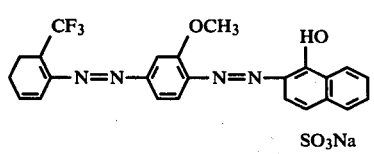
EXAMPLE 38
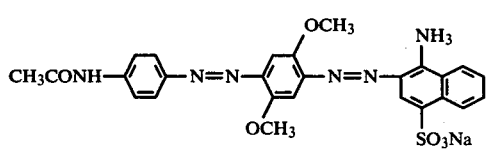
EXAMPLE 39
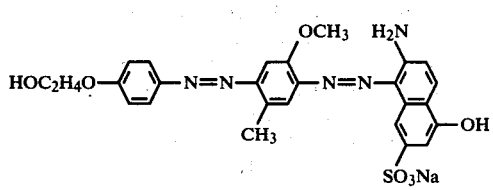

EXAMPLE 40

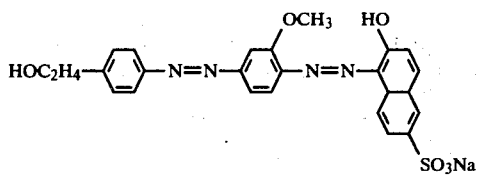

EXAMPLE 41

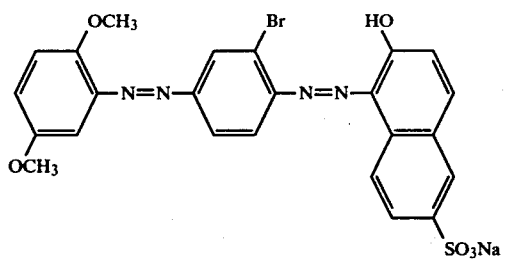

EXAMPLE 42

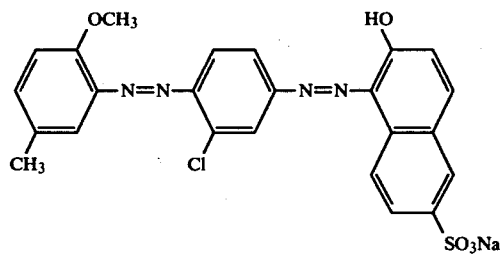

EXAMPLE 43

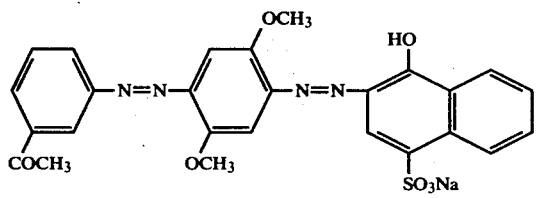

EXAMPLE 44

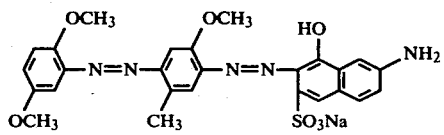

EXAMPLE 45

Into an aqueous dyebath containing 300 parts of water, 0.1 parts of the strong dyestuff described in Example 1, 0.1 parts of nonionic wetting agent, 0.6 parts of monosodium phosphate and 0.075 parts of disodium phosphate, to maintain a pH of 6.0, 10 parts of nylon fabric are entered at 60° C. The temperature is raised to 100° C. and held at 100° C. for 1 hour while the fabric is mildly agitated to assure uniform dyeing. The fabric is then removed from the bath, rinsed with cold water, and dried. It is dyed a very deep shade of very reddish violet.

EXAMPLE 46

The procedure of Example 45 is repeated with 0.05 parts of the strong dyestuffs described in Examples 4, 6 and 10, respectively. One obtains very deep shades of bright violet, navy blue, and very bluish violet, respectively.

EXAMPLE 47

The procedure of Example 45 repeated except that mono- and disodium phosphate are replaced by 1 part of sodium sulfate and the pH of the bath is adjusted to 6.0 before the fabric is entered. Similar results are obtained.

EXAMPLE 48

The procedure of Example 45 is repeated with 0.05 parts to 0.1 part of strong dyestuff from any of the other Examples given, or with a combination of one or more of them, totaling from 0.05 parts to 0.1 part. The fabric will be dyed a deep to very deep shade of the hue, or combination of hues of the selected dye or dyes, given in the corresponding examples.

EXAMPLE 49

The dyed nylon fabric obtained by the procedure of Example 45 is subjected to a washfastness test (AATCC No. 2) which simulates laundering of the kind that is generally applied to nylon apparel in the home.

A rating of 4 is obtained without after-treatment. (Scale 1-5, 5 is maximum.)

When test AATCC No. 2 is applied to dyed nylon fabrics obtained by the methods of Examples 46, 47 or 48, ratings from 4 to 5 are obtained.

EXAMPLE 50

(A) 8.4 parts of pulverized 2-methoxy-4-nitroaniline are stirred in 50 parts of water and 16 parts of hydrochloric acid (d.1.16). 40 parts of ice and a solution of 3.5 parts of sodium nitrite in 7 parts of water are added. The resulting solution is held at 0°-3° C. for one hour and clarified. It is then gradually added to a mixture of 4.7 parts of phenol, 70 parts of water, 2 parts of caustic soda and 9 parts of soda ash, at 3°-6° C. At the end of the reaction, the reaction mixture is neutralized with hydrochloric acid and the insoluble intermediate product is filtered.

(B) The isolated intermediate product from step (A) is reslurried in 120 parts of water at 50° C. and a warm solution of 7.2 parts of sodium sulfide in 25 parts of water is added during 30 minutes while the temperature rises to 62° C. This temperature is maintained for one hour. Enough hydrochloric acid is subsequently added to neutralize while cooling to 20° C. The reduced product precipitates. It is filtered off and washed with water.

(C) The reduced product from step (B) is dissolved in 800 parts of water and 23 parts of hydrochloric acid (d.1.16) at 75° C. Ice is added to cool rapidly to 12° C., followed at once by a solution of 3.4 parts of sodium nitrite in 7 parts of water. One half hour later the solution is clarified at 15° C.

(D) The solution obtained from step (C) is added during one hour to a mixture of 12 parts of 2-amino-8-naphthol-6-sulfonic acid (sodium salt), 5.2 parts of sodium α-naphthalene sulfonate and 100 parts of water while the pH is maintained between 3.5 and 5.5 and the temperature at 0° to 4° C. after one hour the product is neutralized and isolated by filtration. It has the structure

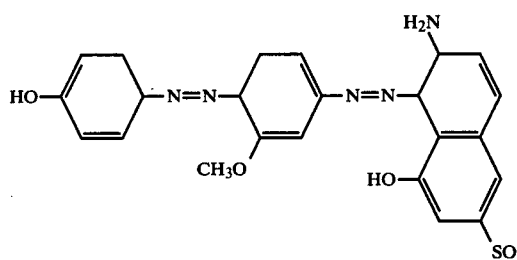

and dyes nylon from neutral dyebaths in strong bluish violet shades.

EXAMPLE 51

5.5 parts of the dyestuff obtained from Example 50, step (D), is dissolved in 75 parts of water and 0.5 parts of caustic soda. 2 parts of dimethylsulfate are added, the temperature is raised to 50° C., and the high pH is maintained with additional caustic soda for one hour. The product is cooled, filtered, and washed with 5% aqueous sodium chloride solution, to obtain the product of Example 28, which dyes nylon from neutral dyebaths in somewhat brighter and bluer shades than the preceding example.

EXAMPLE 52

When the solution obtained from Example 50, step (C), is added to a mixture of 11 parts of 1-naphthol-4-sulfonic acid, 25 parts of soda ash and 200 parts of water at 2°–5° C., the product has the structure

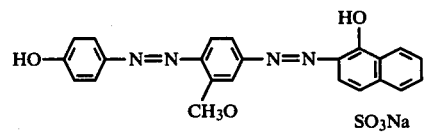

and dyes nylon from neutral dyebaths in very reddish violet shades.

EXAMPLE 53

(E) The intermediate product obtained from Example 50, step (A), is dissolved in 150 parts of water and 1.3 parts of caustic soda. 13 parts of dimethylsulfate is added and the temperature is raised to 45° C., finally to 60° C. The precipitated methylated product is filtered alkaline and washed with water.

(F) The methylated product from (E) above is slurried in 400 parts of water and a solution of 13 parts of sodium disulfide in 40 parts of water is added. The temperature is raised to 65° C. and maintained for one hour. The reduction product is filtered and washed with water.

(0) The reduction product from (F) above, is treatedin 100 parts of water at 5° C. with 12 parts of hydrochloric acid (d.1.16) and 3.3 parts of sodium nitrite for two hours. The solution is clarified and combined with a mixture of 11 parts of 1-naphthol-4-sulfonic acid, 25 parts of soda ash and 200 parts of water at 2°–5° C. A dye is obtained with the structure

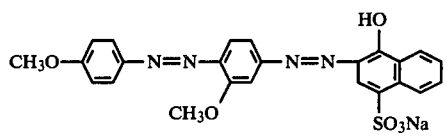

which dyes nylon from neutral dyebaths in very reddish violet shades of greater brightness than the dye from Example 52.

(H) If the reduction product from step (F) above is added during one hour to a mixture of 12 parts of 2-amino-8-naphthol-6-sulfonic acid (sodium salt), 5.2 parts of sodium α-naphthalene sulfonate and 100 parts of water while the pH is maintained between 3.5 and 5.5 and the temperature at 0°–4° C., the dyestuff of Example 28 is obtained.

When the appropriate previous preparations are carried out with potassium salts and caustic potash in place of sodium salts and caustic soda, the potassium salts of the corresponding dyestuffs are obtained.

To obtain the dyes in the form of their free acids, an aqueous suspension of an instant dye is rendered strongly acid with a mineral acid, preferentially concentrated hydrochloric acid and the insoluble acid form of the dye is separated by filtration.

The free acid form of the dye can be neutralized with other bases, as for example lithium hydroxide, lithium carbonate, ammonia, etc. to form dye salts containing the corresponding cations, as desired.

I claim:

1. Polyamide fibers dyed with a compound of the formula

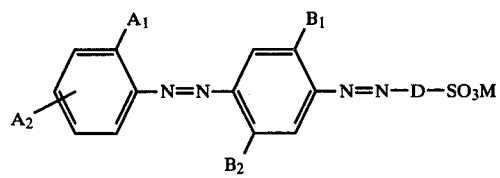

wherein
$A_1$ is hydrogen or methoxy,
$A_2$, $B_1$ and $B_2$ are independently hydrogen, methyl or methoxy, and D—$SO_3$M is
1-hydroxy-4-sulfo-2-naphthyl,
2-hydroxy-6-sulfo-1-naphthyl,
2-amino-6-sulfo-1-naphthyl, or
2-amino-8-hydroxy-6-sulfo-1-naphthyl,
where M is hydrogen, alkali metal or ammonium, provided that at least one of $A_1$, $A_2$, $B_1$ and $B_2$ is methoxy, and no more than one of $A_2$, $B_1$ and $B_2$ is methyl, and further provided that when one of $A_2$, $B_1$ and $B_2$ is methyl, that said methyl be para to a methoxy group.

* * * * *